(12) United States Patent
Nomoto et al.

(10) Patent No.: US 9,228,845 B2
(45) Date of Patent: Jan. 5, 2016

(54) NAVIGATION DEVICE, NAVIGATION METHOD, AND PROGRAM

(75) Inventors: Hirokazu Nomoto, Katsushika-ku (JP); Ichiro Usami, Anjyo (JP); Kensuke Hanaoka, Setagaya-ku (JP); Sayaka Yoshizu, Kawasaki (JP); Hironobu Sugimoto, Chofu-shu (JP); Takao Suzuki, Ofu (JP); Hiroshi Takeuchi, Kobe (JP); Shohji Ueoka, Kobe (JP); Hideaki Miyazaki, Kobe (JP); Toshifumi Obayashi, Toyota (JP); Takayuki Suzumiya, Kawasaki (JP)

(73) Assignees: ASIN AW CO., LTD., Anjo (JP); TOYOTA JIDOSHA KABUSHIKI KAISHA, Tokyo (JP); DENSO CORPORATION, Kariya-shi (JP); FUJITSU LIMIED, Kawasaki-shi (JP); FUJITSU TEM LIMITED, Kobe-shi (JP)

( * ) Notice: Subject to any disclaimer, the term of this patent is extended or adjusted under 35 U.S.C. 154(b) by 138 days.

(21) Appl. No.: 13/991,772
(22) PCT Filed: Dec. 5, 2011
(86) PCT No.: PCT/JP2011/006789
§ 371 (c)(1),
(2), (4) Date: Jul. 19, 2013
(87) PCT Pub. No.: WO2012/086137
PCT Pub. Date: Jun. 28, 2012

(65) Prior Publication Data
US 2013/0304382 A1   Nov. 14, 2013

(30) Foreign Application Priority Data
Dec. 21, 2010   (JP) .................................. 2010-284466

(51) Int. Cl.
*G01C 21/34* (2006.01)
*G01C 21/26* (2006.01)
*G01C 21/36* (2006.01)

(52) U.S. Cl.
CPC ................ *G01C 21/34* (2013.01); *G01C 21/26* (2013.01); *G01C 21/3415* (2013.01); *G01C 21/3626* (2013.01); *G01C 21/3655* (2013.01)

(58) Field of Classification Search
CPC .. G01C 21/34; G01C 21/343; G01C 21/3415; G06F 17/30371
USPC .......................................................... 701/533
See application file for complete search history.

(56) References Cited

U.S. PATENT DOCUMENTS 4,361,202 A * 11/1982 Minovitch .................... 180/168
5,751,245 A * 5/1998 Janky et al. ................ 342/357.4

(Continued)

FOREIGN PATENT DOCUMENTS

JP  A-2008-241474  10/2008
WO  WO 2010/081540 A1  7/2010

OTHER PUBLICATIONS

Mar. 27, 2012 Written Opinion of the International Searching Authority issued in International Application No. PCT/JP2011/006789.

(Continued)

*Primary Examiner* — Behrang Badii
*Assistant Examiner* — Daniel L Greene
(74) *Attorney, Agent, or Firm* — Oliff PLC

(57) ABSTRACT

Navigation systems, methods, and programs acquire deviated point information regarding a deviated point where a vehicle traveling a set route has deviated the route, and acquire post-deviation travel history information regarding a travel history after a deviated vehicle has deviated the route at the deviated point. The systems, methods, and programs determine based on the post-deviation travel history information for each of the deviated vehicles whether the deviated vehicle has traveled along a reroute set after deviating the route at the deviated point, and judges whether a rate of the deviated vehicles which were determined as having traveled along the reroute is a first predetermined value or more. If the rate of the deviated vehicles which were determined as having traveled along the reroute is the first predetermined value or more, the systems, methods, and programs determine that guidance of the route is not appropriate.

8 Claims, 6 Drawing Sheets

(56) References Cited

U.S. PATENT DOCUMENTS

| | | | |
|---|---|---|---|
| 5,774,824 A * | 6/1998 | Streit et al. ............... | 701/446 |
| 6,490,519 B1 * | 12/2002 | Lapidot et al. ............ | 701/117 |
| 6,594,580 B1 | 7/2003 | Tada et al. | |
| 6,621,452 B2 * | 9/2003 | Knockeart et al. ....... | 342/357.31 |
| 6,707,421 B1 * | 3/2004 | Drury et al. .............. | 342/357.31 |
| 6,873,905 B2 * | 3/2005 | Endo et al. ............... | 701/416 |
| 6,982,635 B2 * | 1/2006 | Obradovich ............. | 340/439 |
| 7,149,625 B2 * | 12/2006 | Mathews et al. ......... | 701/420 |
| 7,389,179 B2 * | 6/2008 | Jin et al. .................. | 701/517 |
| 7,512,487 B1 * | 3/2009 | Golding et al. .......... | 701/424 |
| 2006/0080034 A1 * | 4/2006 | Hayashi .................. | 701/211 |
| 2009/0281721 A1 | 11/2009 | Yoshioka et al. | |

OTHER PUBLICATIONS

Mar. 27, 2012 International Search Report issued in International Application No. PCT/JP2011/006789.

* cited by examiner

Fig. 5

| CONDITION | | | | NUMBER OF TIMES | PERIOD | | | |
|---|---|---|---|---|---|---|---|---|
| | | | | | WITHIN A MONTH | WITHIN HALF YEAR | WITHIN A YEAR | MORE THAN A YEAR |
| DAY/NIGHT | SAME | TRAVEL DIREC-TION | SAME DIREC-TION | ONCE | ○ | × | × | × |
| | | | | TWICE | ○ | ○ | × | × |
| | | | | MORE THAN 3 TIMES | ○ | ○ | ○ | ○ |
| | | | DIFFER-ENT DIREC-TION | ONCE | × | × | × | × |
| | | | | TWICE | ○ | × | × | × |
| | | | | 3 TIMES | ○ | ○ | × | × |
| | | | | MORE THAN 4 TIMES | ○ | ○ | ○ | × |
| | OPPO-SITE | TRAVEL DIREC-TION | SAME DIREC-TION | ONCE | × | × | × | × |
| | | | | TWICE | ○ | × | × | × |
| | | | | MORE THAN 3 TIMES | ○ | ○ | × | × |
| | | | DIFFER-ENT DIREC-TION | ONCE | × | × | × | × |
| | | | | TWICE | × | × | × | × |
| | | | | 3 TIMES | × | × | × | × |
| | | | | MORE THAN 4 TIMES | ○ | × | × | × |

NAVIGATION DEVICE, NAVIGATION METHOD, AND PROGRAM

TECHNICAL FIELD

The present invention relates to a navigation device, a navigation method, and a program.

BACKGROUND ART

Conventionally, navigation devices that search for a route based on map data and provide guidance on the route are known. For example, in Japanese Patent Application; Publication No. JP-A-2008-241474, if a vehicle has deviated a guided route, a route is searched based on travel histories such that roads that are often included in the travel histories are used by priority.

SUMMARY OF INVENTION

Mainly, the following three reasons to deviate the guided route are considered. The first reason may be because the guided route is physically inaccessible. The second reason may be because a user could not recognize the guided route and has unintentionally deviated the route. The third reason may be because the user has intentionally deviated the route because the user does not like the route, the route is congested, the user makes a side trip, or the like. In Japanese Patent Application; Publication No. JP-A-2008-241474, the third case is taken into consideration. However, the first and the second cases are not taken into consideration.

In light of the above-mentioned problem, it is an object of the present invention to provide a navigation device, a navigation method, and a program that are able to determine whether the guidance of the route is appropriate.

SOLUTION TO PROBLEM

A navigation device according to a first aspect of the present invention includes: a deviated point information acquiring unit that acquires deviated point information regarding a deviated point where a vehicle traveling with a route being set has deviated the route; a post-deviation travel history information acquiring unit that acquires post-deviation travel history information regarding a travel history after a deviated vehicle has deviated the route at the deviated point, the deviated vehicle being the vehicle traveling with the route being set and having deviated the route at the deviated point; a travel determining unit that determines based on the post-deviation travel history information for each of the deviated vehicles whether the deviated vehicle has traveled along a reroute set after deviating the route at the deviated point; a reroute travel rate judging unit that judges whether a rate of the deviated vehicles which were determined as having traveled along the reroute among the deviated vehicles is a first predetermined value or more; and a guidance determining unit that, if the reroute travel rate judging unit has judged that the rate of the deviated vehicles which were determined as having traveled along the reroute is the first predetermined value or more, determines that guidance of the route is not appropriate. Thereby, it is possible to properly determine whether the guidance of the route at the deviated point is appropriate.

The invention according to a second aspect of the present invention includes: a deviated vehicle information acquiring unit that acquires deviated vehicle information regarding the deviated vehicle; a deviated point knowledge determining unit that determines based on the deviated vehicle information for each of the deviated vehicles whether a user of the deviated vehicle is likely to know road situation of the vicinity of the deviated point; and a no-knowledge vehicle rate judging unit that judges whether a rate of no-knowledge vehicles among the deviated vehicles is a second predetermined value or more, the no-knowledge vehicles being the deviated vehicles which were determined as being less likely to know the road situation of the vicinity of the deviated point. If the no-knowledge vehicle rate judging unit has judged that the rate of the no-knowledge vehicles among the deviated vehicles is the second predetermined value or more, the reroute travel rate judging unit judges whether the rate of the no-knowledge vehicles which were determined as having traveled along the reroute among the no-knowledge vehicles is the first predetermined value or more, and if the reroute travel rate judging unit has judged that the rate of the no-knowledge vehicles which were determined as having traveled along the reroute is the first predetermined value or more, the guidance determining unit determines that the guidance of the route is not appropriate. Thereby, it is possible to more properly determine whether the guidance of the route at the deviated point is appropriate.

In the invention according to a third aspect of the present invention, the post-deviation travel history information acquiring unit acquires the post-deviation travel history information regarding a travel history after the no-knowledge vehicle has deviated the route at the deviated point, and the travel determining unit determines based on the post-deviation travel history information for each of the no-knowledge vehicles whether the no-knowledge vehicle has traveled along the reroute set after deviating the route at the deviated point. In place of the deviated vehicles, the post-deviation travel history information is acquired for the no-knowledge vehicles and it is determined whether the no-knowledge vehicles have traveled along the reroute. Therefore, it is possible to reduce the data processing amount.

The invention according to a fourth aspect of the present invention includes: a deviated point travel history information acquiring unit that acquires deviated point travel history information regarding a travel history of a vehicle that has traveled the deviated point; a travel track judging unit that judges based on the deviated point travel history information whether there is a vehicle that has traveled the deviated point along the route set in the deviated vehicle; and a map data determining unit that, if the travel track judging unit has judged that there is no vehicle that has traveled the deviated point along the route set in the deviated vehicle, determines that map data used for calculation of the route which was set in the deviated vehicle is not appropriate. Thereby, it is possible to properly determine whether the map data used for the calculation of the route is appropriate.

In the invention according to a fifth aspect of the present invention, if the travel track judging unit has judged that there is a vehicle that has traveled the deviated point along the route set in the deviated vehicle, the guidance determining unit determines whether the guidance of the route is appropriate. That is, if the map data is not appropriate, it is not determined whether the guidance of the route is appropriate. If the map data is appropriate, it is determined whether the guidance of the route is appropriate. Thereby, it is possible to more properly determine whether the guidance of the route at the deviated point is appropriate.

The invention according to a sixth aspect of the present invention includes an updating unit that, if the map data determining unit has judged that the map data is not appropriate, updates the map data. Thereby, it is possible to properly update the map data.

The invention according to a seventh aspect of the present invention includes a changing unit that, if the guidance determining unit has determined that the guidance of the route is not appropriate, changes the guidance of the route. Thereby, it is possible to provide guidance easier for the user to understand.

A navigation method according to an eighth aspect of the present invention includes the steps of: acquiring deviated point information regarding a deviated point where a vehicle traveling with a route being set has deviated the route; acquiring post-deviation travel history information regarding a travel history after a deviated vehicle has deviated the route at the deviated point, the deviated vehicle being the vehicle traveling with the route being set and having deviated the route at the deviated point; determining based on the post-deviation travel history information for each of the deviated vehicles whether the deviated vehicle has traveled along a reroute set after deviating the route at the deviated point; judging whether a rate of the deviated vehicles which were determined as having traveled along the reroute among the deviated vehicles is a first predetermined value or more; and if it has been judged that the rate of the deviated vehicles which were determined as having traveled along the reroute is the first predetermined value or more, determining that guidance of the route is not appropriate. By such method, the same effects as the navigation device according to the first aspect of the present invention can be obtained.

A computer program according to a ninth aspect of the present invention causes a computer to execute the functions of: acquiring deviated point information regarding a deviated point where a vehicle traveling with a route being set has deviated the route; acquiring post-deviation travel history information regarding a travel history after a deviated vehicle has deviated the route at the deviated point, the deviated vehicle being the vehicle traveling with the route being set and having deviated the route at the deviated point; determining based on the post-deviation travel history information for each of the deviated vehicles whether the deviated vehicle has traveled along a reroute set after deviating the route at the deviated point; judging whether a rate of the deviated vehicles which were determined as having traveled along the reroute among the deviated vehicles is a first predetermined value or more; and if the reroute travel rate judging unit has judged that the rate of the deviated vehicles which were determined as having traveled along the reroute is the first predetermined value or more, determining that guidance of the route is not appropriate. By executing such program, the same effects as the navigation device according to the first aspect of the present invention can be obtained.

BRIEF DESCRIPTION OF DRAWINGS

FIG. 5 explains a determination example of a deviated point knowledge determination according to the first embodiment of the present invention.

DESCRIPTION OF EMBODIMENTS

Hereinafter, a navigation system according to a first embodiment is explained with reference to drawings.

First Embodiment

Figure 1:
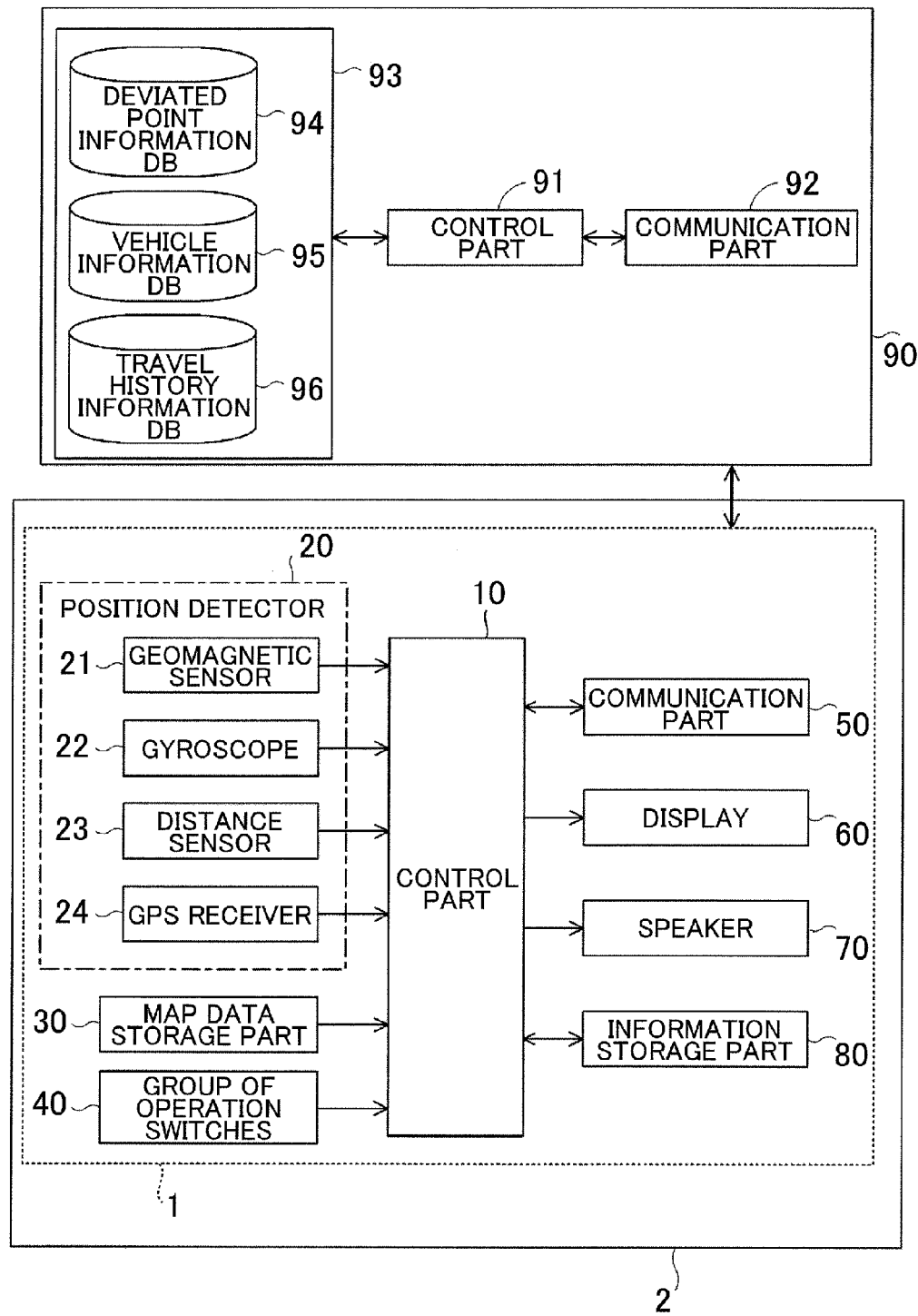
FIG. 1 shows a block diagram indicating a structure of a navigation system according to a first embodiment of the present invention.

As shown in FIG. 1, a navigation device according to the first embodiment of the present invention is realized by an information center 90 that is capable of communicating with an in-vehicle device 1 installed in a vehicle 2. First, the in-vehicle device 1 is explained. The in-vehicle device 1 according to the present embodiment is a so-called in-vehicle navigation device. However, the in-vehicle device 1 is not limited to the in-vehicle navigation device, provided that it is a device communicable with the information center 90, such as a cellular phone, a PC, or the like. The in-vehicle device 1 includes a control part 10, a position detector 20, a map data storage part 30, a group of operation switches 40, a communication part 50, a display 60, a speaker 70, an information storage part 80, and the like. The control part 10 is structured in the center and connected to the position detector 20, the map data storage part 30, the group of operation switches 40, the communication part 50, the display 60, the speaker 70, and the information storage part 80.

The control part 10, which is configured as a normal computer, includes a CPU, a ROM, a RAM, an I/O, and a bus line for connecting these members.

The position detector 20 includes a geomagnetic sensor 21, a gyroscope 22, a distance sensor 23, a GPS (Global Positioning System) receiver 24 that receives electric waves from satellites, and the like, all of which are well-known units. These units 21 to 24 including sensors have different kinds of errors; therefore, they are used with mutual compliment.

The map data storage part 30 is structured with, for example, a hard disk device (HDD). Although the HDD is utilized in the present invention, other media such as a DVD-ROM, a memory card, or the like can be utilized. The map data storage part 30 stores so-called map matching data for improvement of a position detection accuracy and map data for searching for a route.

The group of operation switches 40, which are composed of a touch switch or a mechanical switch integrated with the display 60, a remote control device, or the like, is used for various kinds of input.

The communication part 50 is an element to communicate with the information center 90.

The display 60 is a color display device having a screen composed of liquid crystal or the like. A map, facility information, and the like are displayed through the display 60. The speaker 70 is for outputting audio and used when performing for example route guidance by audio.

The information storage part 80 stores a route search program for searching for a route, a current position determination program for determining a current position of a vehicle 2, and the like. In addition, the information storage part 80 stores a deviated point determination program for determining a point where the vehicle 2 has deviated if the vehicle 2 has deviated while traveling with a route being set and a reroute calculation program for setting a reroute when the vehicle 2 has deviated the set route.

The information storage part 80 stores travel history information regarding all travel histories that the vehicle 2 has traveled, deviated point information regarding a deviated point where the vehicle 2 has deviated the set route, post-deviation travel history information regarding a travel history that the vehicle 2 has traveled after deviating the route at the deviated point, vehicle information regarding the vehicle 2, and the like. The deviated point information includes the set route, the coordinate of the deviated point, a deviation flag representing that the route was deviated at the deviated point. The post-deviation travel history information includes a travel history (coordinates and links) after deviating the route at the deviated point, reroute information regarding a reroute set after deviating the route at the deviated point, and the like. The vehicle information includes information regarding the registered address of the vehicle 2 and the information regarding the residence address of the user of the vehicle 2.

The information center 90 that is communicable with the in-vehicle device 1 includes a control part 91, a communication part 92, a storage part 93, and the like. The control part 91 is structured in the center and connected with the communication part 92.

The control part 91, which is configured as a normal computer, includes a CPU, a ROM, a RAM, an I/O, and a bus line for connecting these members.

The communication part 92 is an element to communicate with the in-vehicle device 1. In addition, the communication center 90 is communicable with in-vehicle devices installed in a plurality of vehicles. However, in FIG. 1, only one in-vehicle device 1 installed in one vehicle 2 is shown. Hereinafter, the in-vehicle 1 communicable with the information center 90 and the vehicle 2 mounted with the in-vehicle device 1 are called a "probe car" as needed.

The storage part 93 is structured with, for example, a hard disk device (HDD). Although the HDD is utilized in the present invention, other media such as a memory card, or the like can be utilized. The storage part 93 stores a deviated point information database (hereinafter, referred to as "DB") 94, a vehicle information DB 95, a travel history information DB 96, and the like.

The deviated point information DB 94 stores the deviated point information acquired from probe cars in association with vehicle IDs. The vehicle information DB 95 stores the vehicle information acquired from the probe cars in association with the vehicle IDs. In addition, the travel history information DB 96 stores the travel history information of the probe cars acquired from the probe cars in association with the vehicle IDs.

In the present embodiment, the control part 91 of the information center 90 performs a route deviation factor determining processing for determining, based on the information acquired from the probe cars, the reason why the set route was deviated. In the present embodiment, the route for which the search was performed in the probe cars and the guidance is provided through the display 60 and the speaker 70 correspond to the "set route".

Here, the route deviation factor determining processing is explained with reference to a flowchart shown in FIG. 2.

At a first step S101 (hereinafter, "Step" is referred to as "S"), the deviated point information storing a position coordinate of a certain point P as a coordinate of the deviated point is acquired from the deviated point information DB 94. Hereinafter, the point P is referred to as "deviated point P". In addition, the vehicle that has deviated the route at the deviated point P while traveling with the route being set is referred to as "deviated vehicle".

At S102, it is judged whether rerouting has occurred more than a predetermined number of times or more at the deviated point P. Here, the route that enters the deviated point P from a link Q and exits the deviated point P to a link R is the target among the routes set in the deviated vehicle. Hereinafter, the route that enters the deviated point P from a link Q and that exits the deviated point P to a link R is referred to as "deviated route (of the deviated point P)". In the present embodiment, the deviated route corresponds to the "route being set in the deviated vehicle". If the vehicle enters the deviated point P from the link Q, does not travel the link R, and is matched on a link other than the link R, it is judged that the route has been deviated. Then, a reroute processing is executed. In the present embodiment, it is judged whether the predetermined number of times or more reroute processings have occurred by deviating the route at the deviated point P and traveling a link other than the link R. If it is judged that the predetermined number of times or more reroute processings have not occurred at the deviated point P (S102: NO), S103 and subsequent processings are not performed. If it is judged that the predetermined number of times or more reroute processings have occurred at the deviated point P, the procedure goes to S103.

At S103, the deviated point travel history information regarding the travel histories of all vehicles that have traveled the deviated point P is acquired from the travel history information DB 96.

At S104, it is judged based on the deviated point travel history information acquired at S103 whether there is a vehicle that has traveled along the deviated route among all vehicles that have traveled the deviated point P. Here, if there is a vehicle that has entered the deviated point P from the link Q and exited the deviated point P to the link R, it is judged that there is a vehicle that has traveled along the deviated route. If there is no vehicle that has entered the deviated point P from the link Q and exited the deviated point P to the link R, it is judged that there is no vehicle that has traveled along the deviated route. If it has been judged that there is a vehicle that has traveled along the deviated route (S104: YES), that is, if there is a vehicle that has entered the deviated point P from the link Q and exited the deviated point P to the link R, the procedure goes to S107. If it has been judged that there is no vehicle that has traveled along the deviated route (S104: NO), that is, there is no vehicle that has entered the deviated point P from the link Q and exited the deviated point P to the link R, the procedure goes to S105.

At S105, it is predicted that the user has deviated the route at the deviated point P because the route was physically not travelable due to a reason for example the road (a link R in this example) was removed for redevelopment. Therefore, it is judged that the map data that is stored in the map data storage part 30 of the in-vehicle device 1 of the deviated vehicle that has deviated the route at the deviated point P and used for calculation of the route is not appropriate. Especially, it is judged that the map data of the vicinity of the deviated point P is not appropriate.

At S106, based on the travel track, the map data stored in the map data storage part 30 of the in-vehicle device 1 installed in the deviated vehicle is updated. In this example, the link R is deleted from the map data storage part 30 because the link R is physically not travelable.

At S107, to which the procedure goes if it has been judged that there is a vehicle that has traveled along the deviated route at the deviated point P (S104: YES), a deviated point knowledge determining processing that determines for each of the deviated vehicles whether the user of the deviated vehicle that is the vehicle that has deviated the deviated route at the deviated point P is likely to know the road situation of the vicinity of the deviated point P is performed. Hereinafter, the user of the deviated vehicle that is likely to know the road situation of the vicinity of the deviated point P is referred to as "user with locality knowledge". The user of the deviated vehicle that is less likely to know the road situation of the vicinity of the deviated point P is referred to as "user without locality knowledge". In addition, the deviated vehicle whose user is likely to know the road situation of the vicinity of the deviated point P is referred to as "deviated vehicle with locality knowledge". The deviated vehicle whose user is less likely to know the road situation of the vicinity of the deviated point P is referred to as "deviated vehicle without locality knowledge". The deviated vehicle without locality knowledge is referred to as "no-knowledge vehicle".

Figure 3:
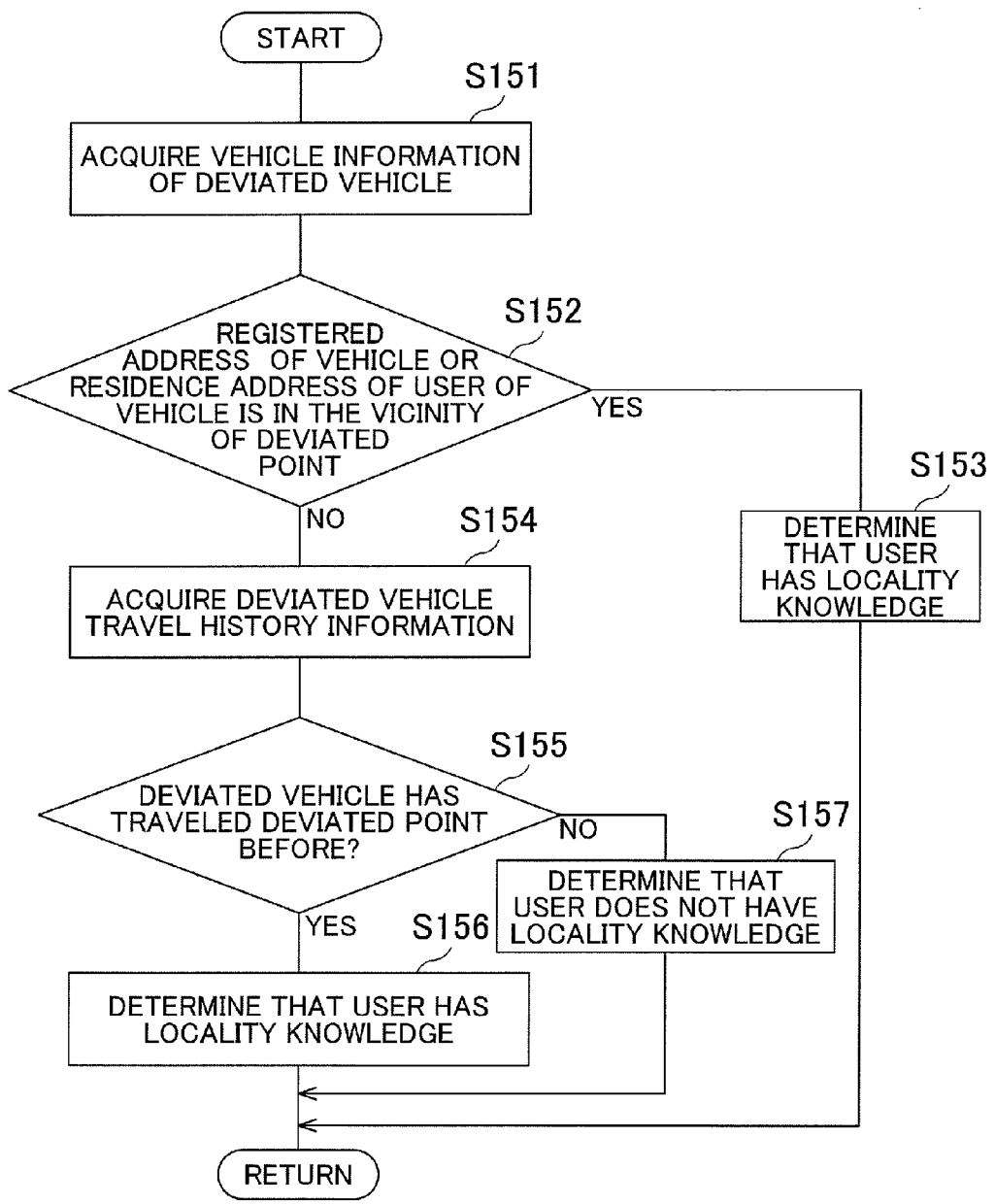
FIG. 3 is a flowchart that explains a deviated point knowledge determining processing according to the first embodiment of the present invention.

The deviated point knowledge determining processing to be executed at S107 is explained with reference to FIG. 3. The deviated point knowledge determining processing shown in FIG. 3 is a processing to be executed for each of the deviated vehicles in the control part 91 of the information center 90.

At S151, the vehicle information of the deviated vehicle that has deviated the route at the deviated point P is acquired from the vehicle information DB 95.

At S152, it is judged whether the registered address of the deviated vehicle or the residence address of the user of the deviated vehicle is in the vicinity of the deviated point P. For example, if the registered address or the residence address is within a predetermined radius (for example, 5 km) centered at the deviated point P, it can be judged that the registered address or the residence address is in the vicinity of the deviated point P. If it has been judged that the registered address or the residence address is not in the vicinity of the deviated point P (S152: NO), the procedure goes to S154. If it has been judged that the registered address or the residence address of the deviated vehicle is in the vicinity of the deviated point P (S152: YES), the procedure goes to S153.

At S153, it is judged that the user of the deviated vehicle is the user with locality knowledge.

At S154, to which the procedure goes if it has been judged that the registered address or the residence address is not in the vicinity of the deviated point P (S152: NO), the deviated vehicle travel history information regarding a travel history of the deviated vehicle is acquired from the travel history information DB 96. The vehicle information of the deviated vehicle acquired at S151 and the deviated vehicle travel history information acquired at S154 correspond to "deviated vehicle information".

At S155, it is judged based on the acquired deviated vehicle travel history information whether the deviated vehicle has traveled the deviated point P before deviating the route at the deviated point P. If it has been judged that the deviated vehicle has never traveled the deviated point P before deviating the route at the deviated point P (S155: NO), the procedure goes to S157. If it has been judged that the deviated vehicle has traveled the deviated point P before deviating the route (S155: YES), the procedure goes to S156.

At S156, it is determined that the user of the deviated vehicle is the user with locality knowledge.

At S157, to which the procedure goes if it has been judged that the deviated vehicle has never traveled the deviated point P before deviating the route (S155: NO), it is determined that the user of the deviated vehicle is the user without locality knowledge.

After the deviated point knowledge determining processing explained with reference to FIG. 3 has been completed for all deviated vehicles, the procedure goes to S108.

At S108, it is judged whether the rate of the deviated vehicles without locality knowledge among all deviated vehicles is a second predetermined value (for example, 90%) or more. If it has been judged that the rate of the deviated vehicles without locality knowledge among all deviated vehicles is less than the second predetermined value (S108: NO), the processing at S109 and subsequent processings are not performed. If the rate of the deviated vehicles without locality knowledge among all deviated vehicles is the second predetermined value or more (S108: YES), the procedure goes to S109.

At S109, the post-deviation travel history information regarding the travel history after the deviated vehicle without locality knowledge has deviated the route at the deviated point P is acquired from the travel history information DB 96.

At S110, it is determined based on the post-deviation travel history information for each of the deviated vehicles without locality knowledge whether the deviated vehicle without locality knowledge has traveled along a reroute set after deviating the route at the deviated point P. Whether the deviated vehicle without locality knowledge has traveled along the reroute may be determined for example based on the travel track of a predetermined distance (for example, 3 km) after deviating the route at the deviated point P, or based on the travel track till a predetermined number of intersections (for example, 3 intersections) are passed after deviating the route at the deviated point P.

At S111, it is judged whether the rate of the vehicles that has traveled along the reroute after deviating the deviated route among the deviated vehicles without locality knowledge is a first predetermined value or more (for example, 80%). If it has been judged that the rate of the vehicles that have traveled along the reroute is less than the first predetermined value (S111: NO), the processing at S112 and subsequent processings are not performed. If it has been judged that the rate of the vehicles that have traveled along the reroute is the first predetermined value or more (S111: YES), the procedure goes to S112.

At S112, it is predicted that the deviated vehicles intended to travel along the route but deviated the route because the guidance was not easy to understand mainly for the users without locality knowledge. It is determined in the in-vehicles 1 of the deviated vehicles that the guidance of the route in the vicinity of the deviated point P is not appropriate. "The guidance is not appropriate" includes a situation such as the audio guidance timing is not appropriate, the drawing depicted on the display 60 is not appropriate, and the like.

At S113, the guidance of the route in the vicinity of the deviated point P is changed. For example, if the deviated vehicles have gone straight at the deviated point P instead of making a turn, the route guidance may be changed such that the route guidance is provided earlier. Or, if the deviated vehicles made a turn at the deviated point P instead of going straight at the deviated point P and making a turn at the next intersection, the route guidance may be changed such that the route guidance is provided later. Obviously, the drawing depicted on the display 60 or a landmark may be changed.

Figure 4:
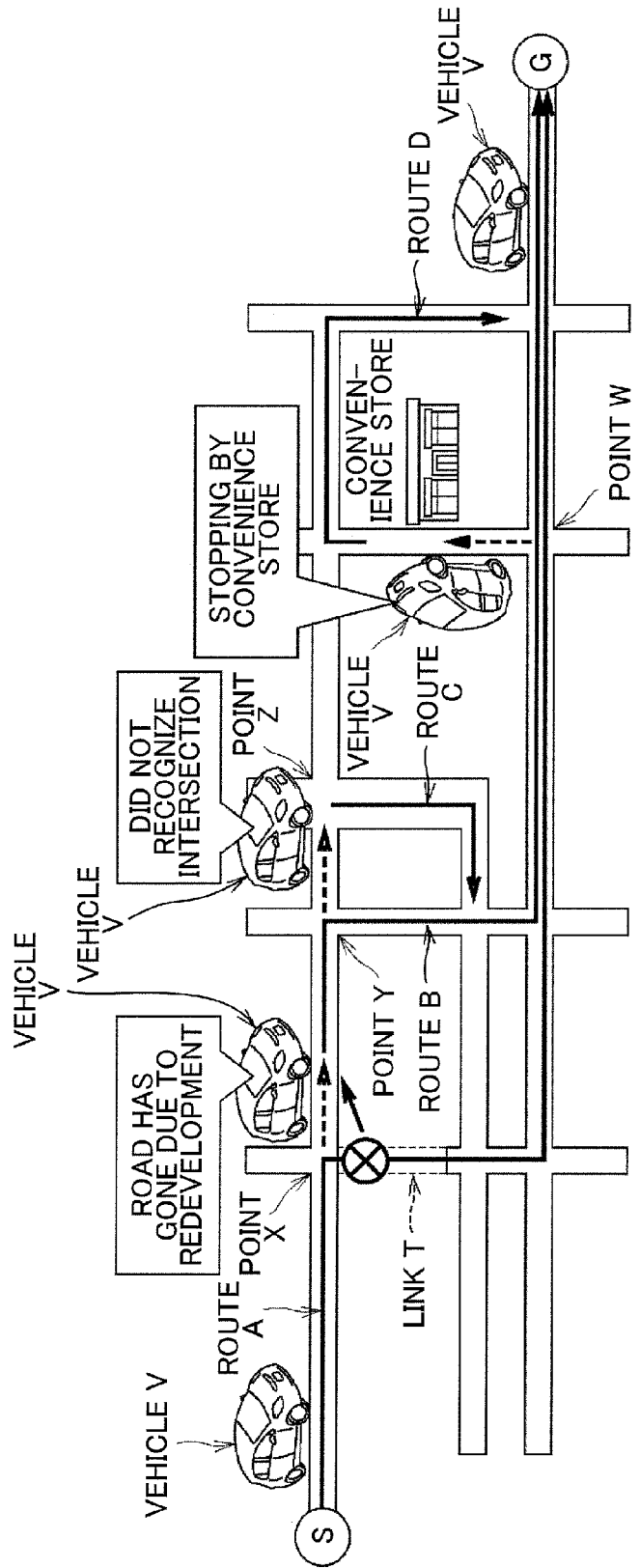
FIG. 4 shows a specific example of a route deviation according to the first embodiment of the present invention.

A case in which the vehicle deviates the set route is explained with reference to FIG. 4.

It is assumed that a vehicle V as a probe car travels from a point S after a route A is set from the point S to a point G. The route A is a route to make a right turn at a point X. However, a link T leaded after the right turn at the point X does not exist due to redevelopment. Thus, the vehicle V cannot make a right turn at the point X. Consequently, the vehicle V deviates the route A at the point X and goes straight. Here, a reroute processing is performed and a new route B is set. In this case, the deviated point is the point X and the deviated point information regarding the point X is stored in the information storage part 80 and transmitted to the information center 90.

It is assumed that the route to make a right turn at a point Y is set; however, the vehicle V misses the right turn due to poor guidance of the in-vehicle device 1. That is, the vehicle V deviates the route B at the point Y and goes straight. At this time, the reroute processing is performed and a reroute C as a new route is set. Here, the point Y is the deviated point, and the deviated point information is stored in the information storage part 80 and transmitted to information center 90. Note that it is assumed that the vehicle V is the deviated vehicle without locality knowledge that is less likely to know the road situation of the vicinity of the point Y.

It is assumed that the reroute C is the route to make a right turn at a point Z and the vehicle V makes a right turn along the reroute C.

At a point W, the route goes straight. However, the user intentionally deviates the route and makes a left turn to stop by the convenience store on the left side in relation to the travel direction.

Here, the route deviation factor determining processing regarding a route that the vehicle V has traveled, which is executed in the information center 90, is explained.

The link T leaded after the right turn at the point X does not exist due to redevelopment; therefore, it is physically not travelable. Thus, no vehicle has traveled along the route A (S104: NO), it is determined that the map data of the vicinity of the point X used for calculation of the route A of the in-vehicle device installed in the vehicle V is not appropriate (S105).

In addition, when the route to make a right turn at the point Y is set, if many users with locality knowledge make a right turn along the route while many users without locality knowledge do not make a right turn, the rate of the deviated vehicles without locality knowledge among the deviated vehicles that have deviated the route at the point Y becomes the second predetermined value or more (S108: YES). In addition, if the deviated vehicles have traveled along the reroute after deviating the route at the point Y as the vehicle V, the users are likely to have missed a right turn at the point Y and deviated the route B instead of intentionally deviated the route B at the point Y. In the same manner as the vehicle V, if more than the first predetermined value of vehicles among the deviated vehicles without locality knowledge have traveled along the reroute (S111: YES), it is determined that the guidance of the route at the point Y is not appropriate (S112).

As described in detail above, the control part 91 of the information center 90 acquires the deviated point information regarding the deviated point where the vehicle traveling with a route being set has deviated the route (S101 in FIG. 2), and acquires the post-deviation travel history information regarding the travel history after the deviated vehicle has deviated the route at the deviated point, the deviated vehicle being the vehicle traveling with the route being set and having deviated the route at the deviated point (S109). It is determined based on the post-deviation travel history information for each of the deviated vehicles whether the deviated vehicle has traveled along the reroute set after deviating the route at the deviated point (S110). If it has been judged that the rate of the deviated vehicles which were determined as having traveled along the reroute is the first predetermined value or more (S111: YES), it is determined that the guidance of the route at the deviated point is not appropriate (S112). In the present embodiment, if the rate of the deviated vehicles which were determined as having traveled along the reroute is the first predetermined value or more, it is predicted that the deviated vehicle has not intentionally deviated the route at the deviated point but deviated the route at the deviated point due to inappropriate guidance of the route while the deviated vehicle was going to travel along the route. In such a case, it is determined that the guidance of the route is not appropriate. Thereby, it is possible to properly determine whether the guidance of the route at the deviated point is appropriate.

The deviated vehicle information regarding the deviated vehicle is acquired (S151 in FIG. 3), and thereafter it is determined based on the deviated vehicle information for each of the deviated vehicles whether the user of the deviated vehicle is likely to know the road situation of the vicinity of the deviated point (S153, S156, and S157). It has been judged whether the rate of the no-knowledge vehicles, which are the deviated vehicles determined as being less likely to know the road situation of the vicinity of the deviated point, among the deviated vehicles is a second predetermined value or more (S108). If it has been judged that the rate of the no-knowledge vehicles among the deviated vehicles is the second predetermined value or more (S108: YES), and if it has been judged that the rate of the no-knowledge vehicles determined as having traveled along the reroute among the no-knowledge vehicles is the first predetermined value or more (S111: YES), it is determined that the guidance of the route at the deviated point is not appropriate (S112). In the present embodiment, if the rate of the no-knowledge vehicles among the deviated vehicles is the second predetermined value or more, it is predicted that the users have deviated the route due to poor guidance, i.e., because the guidance of the route is not easy to understand especially for the users that do not know the road situation of the vicinity of the deviated point. Therefore, it is determined that the guidance of the route is not appropriate. Thereby, it is possible to more properly determine whether the guidance of the route at the deviated point is appropriate. In addition, the post-deviation travel history information regarding the no-knowledge vehicles instead of the deviated vehicles is acquired and whether the no-knowledge vehicles have traveled along the reroute is determined. Therefore, the data processing amount can be reduced.

The deviated vehicle information includes the information regarding the registered address of the deviated vehicle or the residence address of the user of the deviated vehicle. In addition, if it has been judged that the registered address or the residence address of the deviated vehicle is in the vicinity of the deviated point (S152: YES), it is determined that the user of the deviated vehicle is likely to know the road situation of the vicinity of the deviated point (S153). In addition, the deviated vehicle information includes the deviated vehicle travel history information regarding the travel history of the deviated vehicle. If it has been judged based on the deviated vehicle travel history information that the deviated vehicle has traveled the deviated point before deviating the route at the deviated point (S155: YES), it is determined that the user of the deviated vehicle is likely to know the road situation of the vicinity of the deviated point (S156). Thereby, it is possible to properly determine that the user of the deviated vehicle is likely to know the road situation of the vicinity of the deviated point.

The deviated point travel history information regarding the travel history of the vehicle that has traveled the deviated point is acquired (S103 in FIG. 2), and if it has been judged based on the deviated point travel history information that there is no vehicle that has traveled along the route set in the deviated vehicle (S104: NO), it is determined that the map data used for the calculation of the route in the deviated vehicle is not appropriate (S105). If there is no vehicle that has traveled along the route set in the deviated vehicle, it is predicted that the route was physically not travelable because the road does not exist due to redevelopment, for example. Therefore, it is determined that the map data used for calculation of the route is not appropriate. Thereby, it is possible to properly determine whether the map data used for calculation of the route is appropriate.

If it has been judged that there is a vehicle that has traveled along the route set in the deviated vehicle (S104: YES), it is determined whether the guidance of the route is appropriate (S112). That is, if there is no vehicle that has traveled along the route set in the deviated vehicle and the map data is not appropriate, the determination of whether the guidance of the route is appropriate is not performed. If the map data is appropriate, the determination of whether the guidance of the route is appropriate is performed. Thereby, it becomes possible to more properly determine whether the guidance of the route at the deviated point is appropriate.

An updating unit that updates the map data is further provided. Therefore, if it has been determined that the map data used for the calculation of the route is not appropriate (S105), the map data can be properly updated. In addition, it is possible to reduce collection of new driven data to identify points where the map data is not appropriate and processing relating to analysis of the collected data.

If it has been determined that the guidance of the route is not appropriate (S112), the guidance of the route is changed (S113). Thereby, it is possible to provide guidance easy to understand for the user.

According to the present embodiment, the control part 91 of the information center 90 serves as a "deviated point information acquiring unit", a "post-deviation travel history information acquiring unit", a "travel determining unit", a "reroute travel rate judging unit", a "guidance determining unit", a "deviated vehicle information acquiring unit", a "deviated point knowledge determining unit", a "no-knowledge vehicle rate judging unit", a "deviated point travel history information acquiring unit", a "travel track judging unit", a "map data determining unit", an "updating unit", and a "changing unit". S101 in FIG. 2 corresponds to the processing executed by the "deviated point information acquiring unit". S109 corresponds to the processing executed by the "post-deviation travel history information acquiring unit". S110 corresponds to the processing executed by the "travel determining unit". S111 corresponds to the processing executed by the "reroute travel rate judging unit". S112 corresponds to the processing executed by the "guidance determining unit". S151 and S154 in FIG. 3 correspond to the processing executed by the "deviated vehicle information acquiring unit". S153, S156, and S157 correspond to the processing executed by the "deviated point knowledge determining unit". S108 in FIG. 2 corresponds to the processing executed by the "no-knowledge vehicle rate judging unit". S103 corresponds to the processing executed by the "deviated point travel history information acquiring unit". S104 corresponds to the processing executed by the "travel track judging unit". S105 corresponds to the processing executed by the "map data determining unit". S106 corresponds to the processing executed by the "updating unit". S113 corresponds to the processing executed by the "changing unit".

The present invention is not limited to the above-mentioned embodiment. Accordingly, various alternatives may be possible without departing from the broad spirit and scope of the underlying principles.

(a) Locality Knowledge Determination

At S152, regarding the judgment of whether the registered address of the deviated vehicle or the residence address of the user of the deviated vehicle is in the vicinity of the deviated point, if the registered address or the residence address is within a predetermined radius centered at the deviated point, it has been judged that the registered address or the residence address is in the vicinity of the deviated point P. In other embodiments, if the registered address or the residence address is within the same administrative area where the deviated point is located, it may be judged that the registered address or the residence address is in the vicinity of the deviated point. Or, if the registered address or the residence address is within the same mesh area where the deviated point is located, it may be judged that the registered address or the residence address is in the vicinity of the deviated point. The mesh is created by sectioning map data by a predetermined area.

At S155 to 157, it is judged whether the deviated vehicle has traveled the deviated point before deviating the route at the deviated point (S155). If the judgment result is positive (S155: YES), it is determined that the user has the locality knowledge (S156). If the judgment result is negative (S155: NO), it is determined that the user does not have the locality knowledge (S157). In other embodiments, whether the deviated vehicle has the locality knowledge may be determined based on time period information and the travel direction when the deviated vehicle has passed the deviated point before deviating the route at the deviated point, the number of times the deviated vehicle has passed the deviated point, the time when the deviated vehicle has passed the deviated point. The time period information is information regarding the time period when the deviated vehicle has passed the deviated point P. It may be, for example, a daytime classification if the travel time is between 6:00 and 18:00 and a night time classification if the travel time is between 18:00 and 6:00. Or, the time period may be classified more by adding "early morning", "early evening", "late evening", and the like. In other words, if the deviated vehicle has traveled the deviated point before deviating the route at the deviated point, the deviated point knowledge determining unit determines based on the time period information when the deviated vehicle has deviated the route at the deviated point and the time period information when the deviated vehicle has traveled the deviated point before whether the user of the deviated vehicle is likely to know the road situation of the vicinity of the deviated point. In addition, if the deviated vehicle has traveled the deviated point before deviating the route at the deviated point, the deviated point knowledge determining unit determines based on the travel direction when the deviated vehicle has deviated the route at the deviated point and the travel direction when the deviated vehicle has traveled the deviated point before whether the user of the deviated vehicle is likely to know the road situation of the vicinity of the deviated point. Further, if the deviated vehicle has traveled the deviated point before deviating the route at the deviated point, the deviated point knowledge determining unit determines based on the number of times the deviated vehicle has passed the deviated point before whether the user of the deviated vehicle is likely to know the road situation of the vicinity of the deviated point.

FIG. 5 shows a specific example of how to determine the locality knowledge based on the time period information, the travel direction, the number of times the deviated vehicle has passed the deviated point, and the time when the deviated vehicle has passed the deviated point.

In FIG. 5, the cases in which it is determined that the user has the locality knowledge are indicated with "○", and the cases in which it is determined that that the user does not have the locality knowledge are indicated with "x".

For example, it is assumed that the deviated vehicle Vx has deviated the route at the deviated point P when the route that enters the deviated point P from the link Q and that exits the deviated point P to a link R is set. Here, the travel direction is regarded as the same direction if the deviated vehicle enters the deviated point P from the link Q. On the other hand, the travel direction is regarded as a different direction if the deviated vehicle enters the deviated point P from a link other than the link Q. In addition, it is assumed that the time period when the deviated vehicle has deviated the route at the deviated point P is the daytime classification.

Here, if the deviated vehicle Vx has traveled the deviated point P once before deviating the route at the deviated point P, and further if the traveled time period is the same in either the daytime or the nighttime classification, the travel direction is the same, and the deviated vehicle has traveled the deviated point P during the past one month, it is determined that the user of the deviated vehicle has the locality knowledge. On the other hand, if the deviated vehicle has traveled the deviated point P once before deviating the route at the deviated point P, and further if the traveled time period is different, the travel direction is different, and the time when the deviated vehicle has traveled is more than one month before, it is determined that the user of the deviated vehicle does not have the locality knowledge.

(b) In other embodiments, the following procedure may be applied. The processings at S107 and S108 in FIG. 2 are omitted; the post-deviation travel history information is acquired for all deviated vehicles at S109; it is determined at S110 for each of the all deviated vehicles whether the deviated vehicle has traveled along the reroute; it is judged at S111 whether the rate of the deviated vehicles which were determined as having traveled along the reroute among the all deviated vehicles is the first predetermined value or more; if it has been judged that the rate of the deviated vehicles which were determined as having traveled along the reroute is the first predetermined value or more, it may be determined at S112 that the guidance of the route is not appropriate. In such configuration, the same effects as the above-mentioned embodiment can be obtained.

Figure 2A:
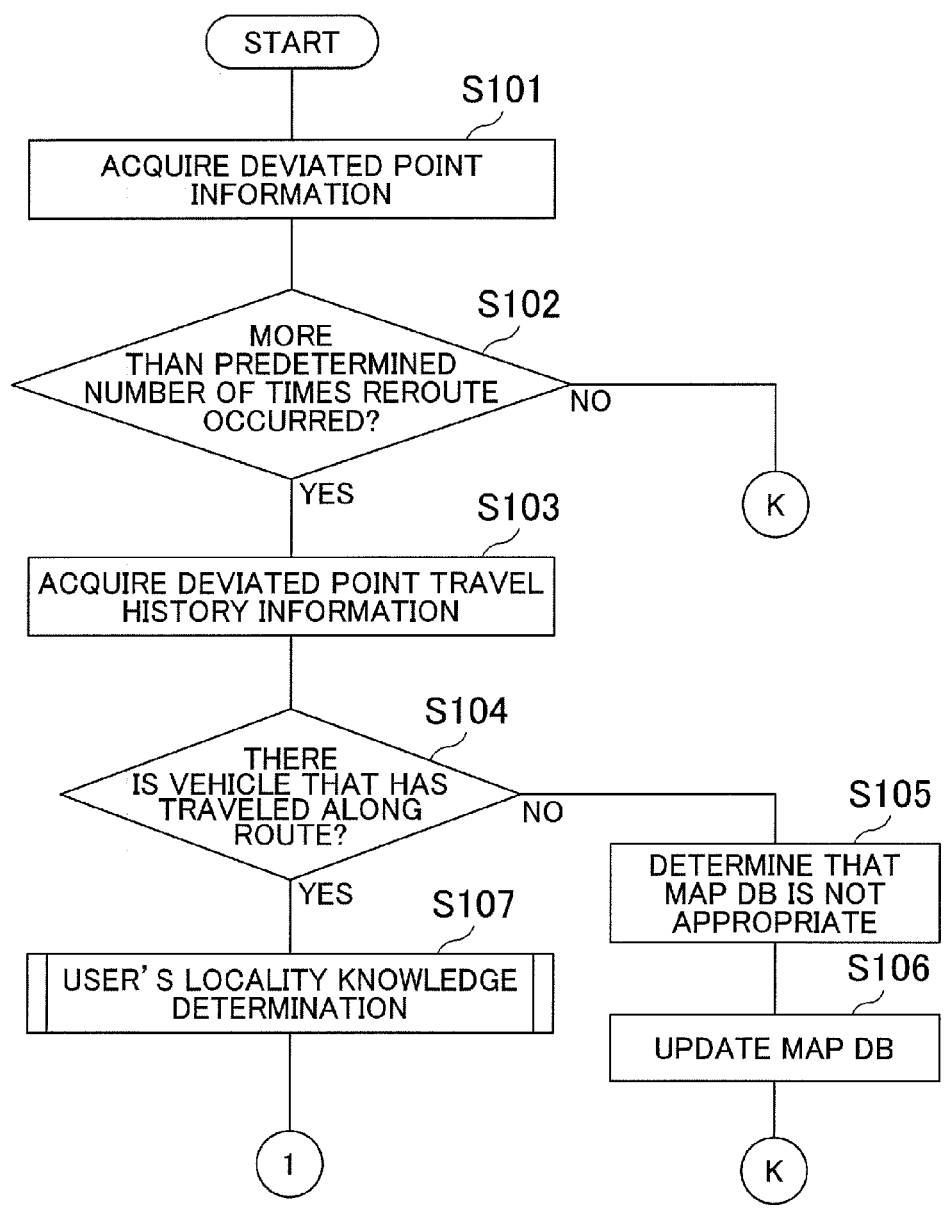
FIG. 2A is a flowchart that explains a route deviation factor determining processing according to the first embodiment of the present invention.
Figure 2B:
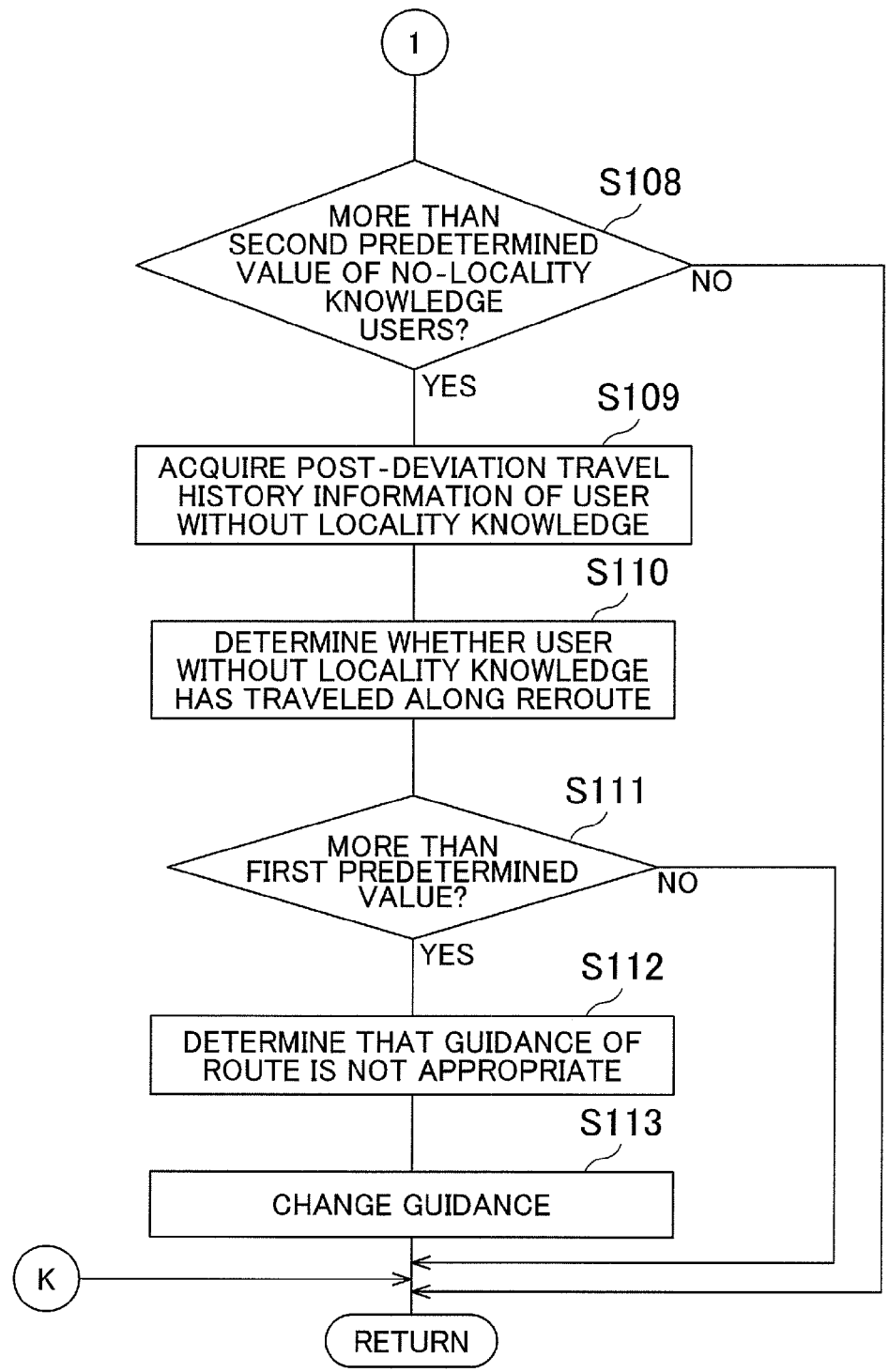
FIG. 2B is a flowchart that explains a route deviation factor determining processing according to the first embodiment of the present invention.

Or, the processings at S104 to S106 in FIG. 2 may be omitted. Or, only the processing at S106 may be omitted. For example, instead of automatically updating the map data of the deviated vehicle, the field study of the vicinity of the deviated point may be performed and the map data of the deviated vehicle may be updated based on the study in a separate processing. In the same manner, the processing at S113 may be omitted. For example, instead of automatically changing the guidance of the route, the field study of the vicinity of the deviated point may be performed and the guidance of the route of the deviated vehicle may be changed based on the study in a separate processing.

(c) In the above-mentioned embodiment, the control part 91 of the information center 90 serves as the "deviated point information acquiring unit", the "post-deviation travel history information acquiring unit", the "travel determining unit", the "reroute travel rate judging unit", the "guidance determining unit", the "deviated vehicle information acquiring unit", the "deviated point knowledge determining unit", the "no-knowledge vehicle rate judging unit", the "deviated point travel history information acquiring unit", the "travel track judging unit", the "map data determining unit", the "updating unit", and the "changing unit". Another embodiment may be a program that causes a computer to execute the functions of these units, a storage media that stores such program, or may be a navigation method to perform a "deviated point information acquiring step", a "post-deviation travel history information acquiring step", a "travel determining step", a "reroute travel rate judging step", a "guidance determining step", a "deviated vehicle information acquiring step", a "deviated point knowledge determining step", a "no-knowledge vehicle rate judging step", a "deviated point travel history information acquiring step", a "travel track judging step", a "map data determining step", a "updating step", and a "changing step".

While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

The invention claimed is:

1. A navigation device, comprising:
a memory storing a guidance program; and
a processor that, when executing the stored program:
acquires deviated point information regarding a deviated point where a vehicle traveling a set route has deviated the set route;
acquires post-deviation travel history information regarding a travel history, the travel history indicating routes that past deviated vehicles have traveled in the past after having deviated the set route at the deviated point;
determines based on the post-deviation travel history information whether each past deviated vehicle had traveled along a reroute set after deviating the route at the deviated point;
determines whether a percentage of the past deviated vehicles that were determined as having traveled along the reroute is a first predetermined value or more;
when it is determined that the percentage of the past deviated vehicles that were determined as having traveled along the reroute is the first predetermined value or more, determines that guidance of the set route is not appropriate; and
when it is determined that the guidance of the route is not appropriate, changes the guidance of the route.

2. The navigation device according to claim 1, wherein the processor, when executing the stored program:
acquires deviated vehicle information regarding each past deviated vehicle;
determines based on the acquired deviated vehicle information whether a user of the past deviated vehicle is likely to have known a road situation of the vicinity of the deviated point, and when the past deviated vehicle is not likely to have known the road situation of the vicinity of the deviated point, deeming that past deviated vehicle to be a no-knowledge vehicle;
determines whether a rate of no-knowledge vehicles among the past deviated vehicles is a second predetermined value or more;
when the rate of the no-knowledge vehicles among the past deviated vehicles is the second predetermined value or more:
determines a rate of the no-knowledge vehicles that had traveled along a reroute set after deviating the route at the deviated point;
determines whether the rate of the no-knowledge vehicles that were determined as having traveled along the reroute among the no-knowledge vehicles is the first predetermined value or more; and
when the rate of the no-knowledge vehicles that were determined as having traveled along the reroute is the first predetermined value or more, determines that the guidance of the route is not appropriate.

3. The navigation device according to claim 2, wherein the processor, when executing the stored program:
acquires the post-deviation travel history information regarding a travel history for each no-knowledge vehicle for a travel of the no-knowledge vehicle after the no-knowledge vehicle has deviated the route at the deviated point; and
determines whether each no-knowledge vehicle has traveled along the reroute set after deviating the route at the deviated point based on the acquired travel history information.

4. The navigation device according to claim 1, wherein the processor, when executing the program:
acquires deviated point travel history information regarding a travel history of vehicles that have traveled the deviated point in the past;
determines based on the deviated point travel history information whether there is a particular vehicle that has traveled the deviated point and continued along the set route; and
when it is determined that there is no particular vehicle has traveled the deviated point along the set route, determines that map data used for calculation of the set route is not appropriate.

5. The navigation device according to claim 4, wherein
when it is determined that there is a particular vehicle that has traveled the deviated point along the set route, determines whether the guidance of the set route is appropriate.

6. The navigation device according to claim 4, wherein the processor, when executing the stored program:
when it is determined that the map data is not appropriate, updates the map data.

7. A navigation method comprising:
acquiring deviated point information regarding a deviated point where a vehicle traveling a set route has deviated the set route;
acquiring post-deviation travel history information regarding a travel history, the travel history indicating routes that past deviated vehicles have traveled in the past after having deviated the set route at the deviated point;
determining based on the post-deviation travel history information whether each past deviated vehicle had traveled along a reroute set after deviating the route at the deviated point;
determining whether a percentage of the past deviated vehicles that were determined as having traveled along the reroute is a first predetermined value or more;
when it has been determined that the percentage of the past deviated vehicles that were determined as having traveled along the reroute is the first predetermined value or more, determining that guidance of the set route is not appropriate; and
when it is determined that the guidance of the route is not appropriate, changing the guidance of the route.

8. A non-transitory computer-readable storage medium storing a computer-executable navigation program, the program comprising:
instructions for acquiring deviated point information regarding a deviated point where a vehicle traveling a set route has deviated the set route;
instructions for acquiring post-deviation travel history information regarding a travel history, the travel history indicating routes that past deviated vehicles have traveled in the past after having deviated the set route at the deviated point;
instructions for determining based on the post-deviation travel history information whether each past deviated vehicle had traveled along a reroute set after deviating the route at the deviated point;
instructions for determining whether a percentage of the past deviated vehicles that were determined as having traveled along the reroute is a first predetermined value or more;
instructions for, when it has been determined that the percentage of the past deviated vehicles that were determined as having traveled along the reroute is the first predetermined value or more, determining that guidance of the set route is not appropriate; and
instructions for, when it is determined that the guidance of the route is not appropriate, changing the guidance of the route.

* * * * *